June 17, 1924.
C. E. CRANDALL ET AL
FLOAT OPERATED CIRCUIT CLOSER
Filed May 4, 1921
1,497,712
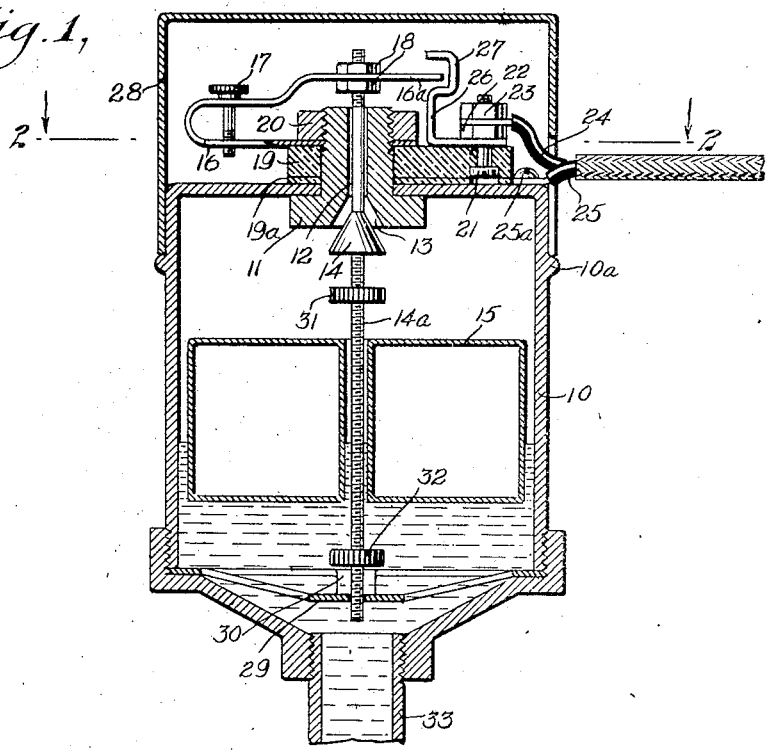
Fig. 1,
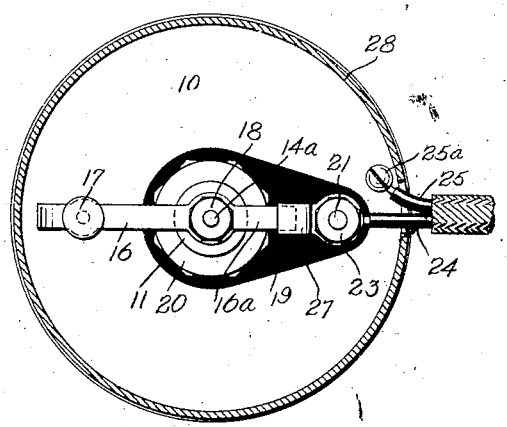
Fig. 2,
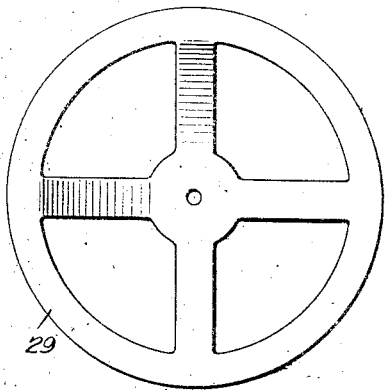
Fig. 3.
WITNESSES
Edw. Thorpe
J. L. McAuliffe
INVENTORS
F. M. Crandall
C. E. Crandall
BY
Munn & Co.
ATTORNEYS Patented June 17, 1924.

1,497,712

UNITED STATES PATENT OFFICE.

CHARLES EDWARD CRANDALL AND FREMONT MARCELIS CRANDALL, OF LAPORTE, MINNESOTA.

FLOAT-OPERATED CIRCUIT CLOSER.

Application filed May 4, 1921. Serial No. 466,750.

*To all whom it may concern:*

Be it known that we, CHARLES EDWARD CRANDALL and FREMONT MARCELIS CRANDALL, citizens of the United States, and residents of Laporte, in the county of Hubbard and State of Minnesota, have invented new and Improved Float-Operated Circuit Closers, of which the following is a description.

The general object of our invention is to provide means to automatically sound an alarm such as an electric buzzer, bell, or similar electric appliance when the oil in the crank case of an automobile engine or other container to which the device is applied has reached a predetermined level, or levels, that is to say, when the said liquid shall have reached a predetermined high level or a predetermined lower level, whereby to automatically give a signal.

More specifically, the invention has in view to provide a device of the indicated type, improved in various particulars with a view to promote efficiency in operation, simplicity of assemblage, and convenience of adjustment and control.

The nature of the invention, its distinguishing features and advantages will appear as the description proceeds.

Reference is to be had to the accompanying drawings forming a part of the specification, it being understood that the drawings are merely illustrative of one example of the invention.

Figure 1 is a vertical section of an alarm embodying our invention:

Figure 2 is a horizontal section on the line 2—2, Figure 1:

Figure 3 is a plan view of the lower spider, for centering the valve rod and float guide.

In carrying out our invention in accordance with the illustrated example, a reservoir 10 is provided, to receive oil, a given level, or levels, of which are to be indicated. In the central opening in the top of said reservoir is a plug 11 flanged at its lower end to lie against the under side of the reservoir top so that the plug extends above the top. Said plug has an axial bore 12 and a valve seat 13 is formed at the lower end of said bore. A valve 14 is provided on a vertical rod $14^a$, and a float 15 of any suitable construction is provided in the reservoir 10, through which float the valve rod $14^a$ passes so that the float will give axial movement to said valve rod for seating or unseating the valve 14. The valve rod $14^a$ extends through the bore 12 and above the plug 11 and is suspended on an arm of a plate spring 16 which is bent upon itself. The rod $14^a$ extends through the upper arm of the spring 16 and is clamped thereto by set nuts 18 on the rod $14^a$ above and below the spring arm. An adjusting screw 17 passes through the upper and lower arms of the spring 16 and bears upon the upper arm, the lower end of the screw having threaded engagement with the lower arm of the spring to vary the tension of the latter and vary the contact for closing the circuit as will appear.

An insulating block 19 is provided on top of the reservoir 10 and an insulating plate $19^a$ beneath the block 19. The lower arm of the spring 16 passes over the upper threaded end of the plug 11 and said spring and the insulating block 19 and plate $19^a$ are clamped by a nut 20 on said plug, said block and plate having vertical holes through which said plug extends. The plate $19^a$ is provided to protect the binding screw 21 which extends vertically through the plug 19 from the under side and receives binding nuts 23 for the conductor terminal 24, the other conductor terminal 25 being secured by a screw $25^a$ in metallic contact with the reservoir 10 or otherwise arranged to complete an electric circuit of a buzzer, bell, or other electric alarm (not shown).

Nuts 23 clamp the horizontal base of an upstanding fixed contact 26, the upper end of which is given a U-bend as at 27 to lie above and below the adjacent free end $16^a$ of the upper arm of the spring 16, said end $16^a$ constituting a movable contact element. A cap-like housing 28 fits on top of the casing 10 and rests on an annular shoulder $10^a$ thereon to house the contacts, terminals, etc., disposed above the top of the reservoir.

The plug 11 is provided with a central bore 12 in which is adapted for vertical movement the upper end of the valve rod $14^a$, the lower end of which passes through a bore in the boss 30 carried by the spider 29, which spider is arranged at the lower end of the reservoir 10. By this arrangement the rod $14^a$ is permitted vertical movement with respect to the plug 11 and the spider 29. Upper and lower nuts or internally threaded collars 31, 32 are provided on the valve plug $14^a$ above and below the float 15 to be adjustable to various positions for determining the high and low liquid levels at which the circuit will be closed and the alarm sounded. The character 33 represents an inlet pipe to the reservoir 10 which is adapted to be connected, in practice, with the reservoir or crank case or other liquid container, the level of which is to control the alarm.

With the described arrangement as liquid rises above a predetermined level in the reservoir 10, the rising of the float 15 to engage the upper collar or nut 31 will engage the movable contact 16$^a$ with the upper overhanging end of the fixed contact 26. At the same time, the valve 14 will be moved against its seat 13, thereby preventing the escape of air and preventing the further entrance of oil or liquid to the reservoir. On the other hand falling of the liquid level in the reservoir 10 to a predetermined point will cause the float 15 to fall and engage the lower nut or collar 32 and draw the valve rod 14$^a$ downwardly against the tension of its suspending spring 16 until the movable contact 16$^a$ engages the fixed contact 26 at the lower portion of the U-bend 27 thereof.

We would state in conclusion that while the illustrated example constitutes a practical embodiment of our invention, we do not limit ourselves strictly to the exact details herein illustrated, since manifestly the same can be considerably varied without departure from the spirit of the invention as defined in the appended claims.

Having thus described our invention, we claim:

1. In a level alarm in combination with a reservoir presenting at its upper end an opening, of a plug provided with a flange extending through said opening, said plug having a through bore merging into a conical valve-seat at its lower end, the upper end of said plug being exteriorly threaded, an insulating block surrounding said plug and positioned outwardly of said reservoir, a nut threaded to said plug for clamping said plug and insulating block against movement, a U-shaped member having one of its legs held between said block and said nut, a rod threaded at both ends extending through said bore and suspended on the free leg of said U-shaped member, said rod being provided with a valve adapted to coact with said valve seat, a float within said reservoir slidable along said rod, adjustable means threaded to the lower end of said rod at both sides of said float to be engaged by the float when the fluid level within the reservoir reaches a predetermined high or low point, and means on said insulating block adapted to be engaged by the free leg of said U-shaped member whenever said float engages said means.

2. In a level alarm in combination with a reservoir formed at its upper end with an opening and provided at its lower end with a spider having a central opening, a float within said reservoir, a plug having an annular flange at one end extending through said opening, and having said flange bearing against the inner face of said upper end of the reservoir, said plug and said float having centrally-extending bores alined with each other and alined with the opening in the spider, means clamping said plug in place, a spring element constituting a movable electrical contact held between said means, a rod threaded for the greater portion of its length suspended on said spring contact and slidably extending through the bores in the plug and reservoir and through said opening in the spider, nuts on said rod at each side of said float adapted to be engaged by said float upon the latter moving a predetermined distance with the changing of the fluid level, said rod moving said spring when said float engages either one of said nuts, and means adjacent said plug adapted to be engaged by said spring and thereby closing an electrical circuit whenever said spring is moved by said float.

CHARLES EDWARD CRANDALL.
FREMONT MARCELIS CRANDALL.